Feb. 7, 1956 J. R. TATE 2,733,936
RETRACTIBLE TRAILER HITCH
Filed April 12, 1954 2 Sheets-Sheet 1
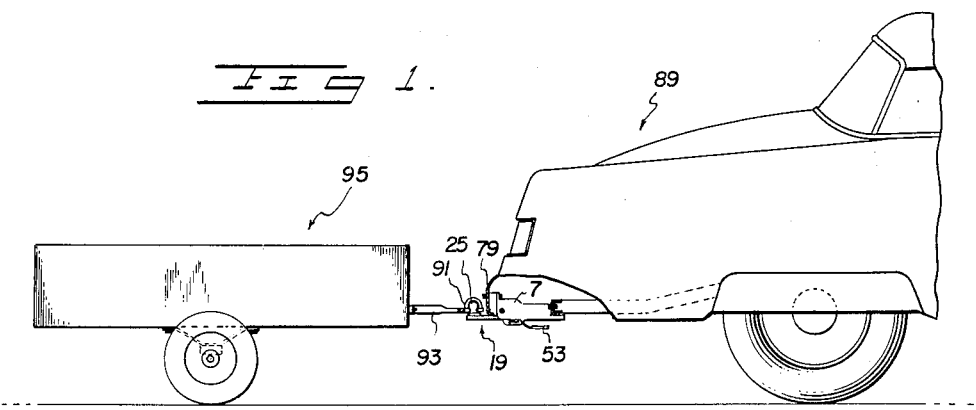
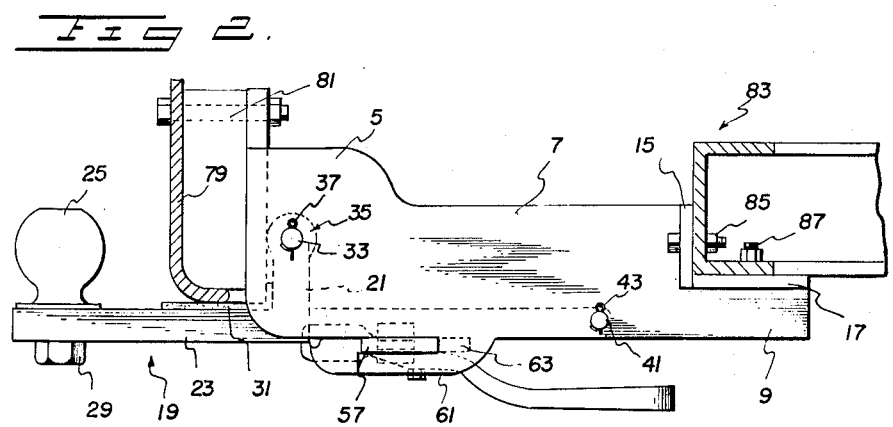
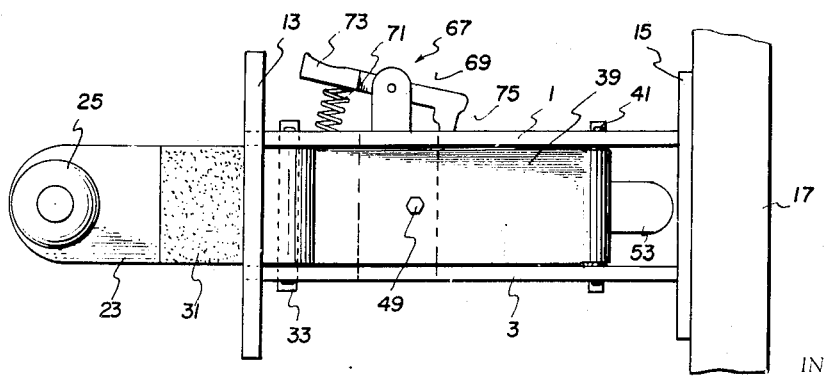
INVENTOR
JOHN R. TATE.
BY
Peck & Peck
ATTORNEYS

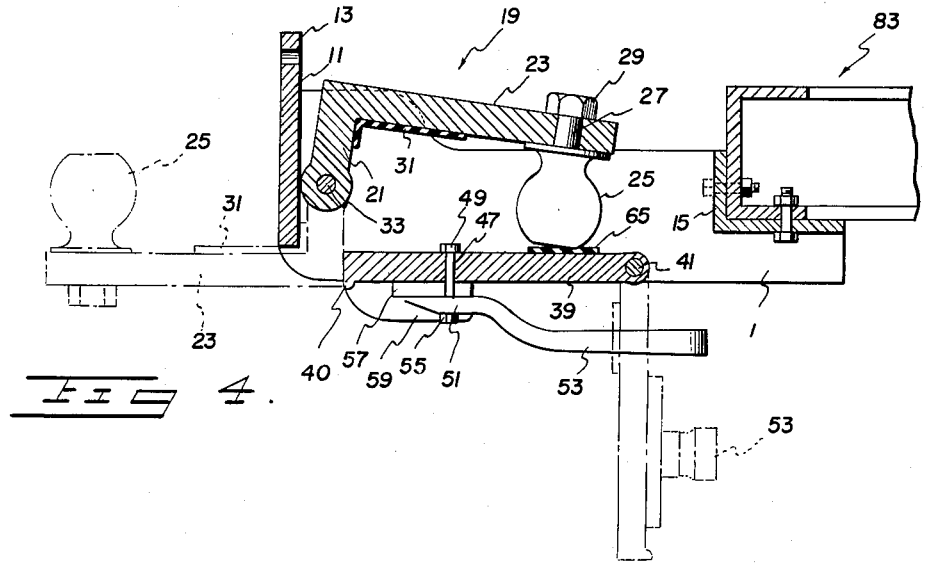
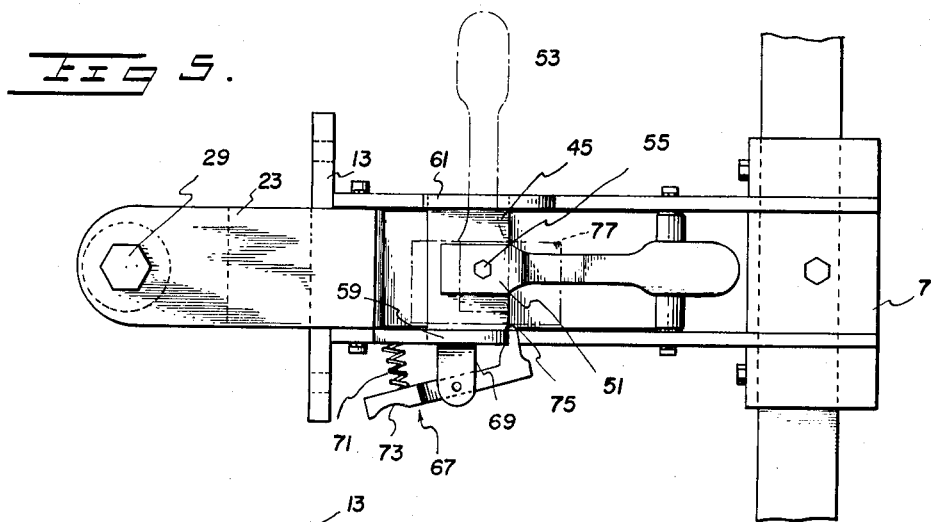
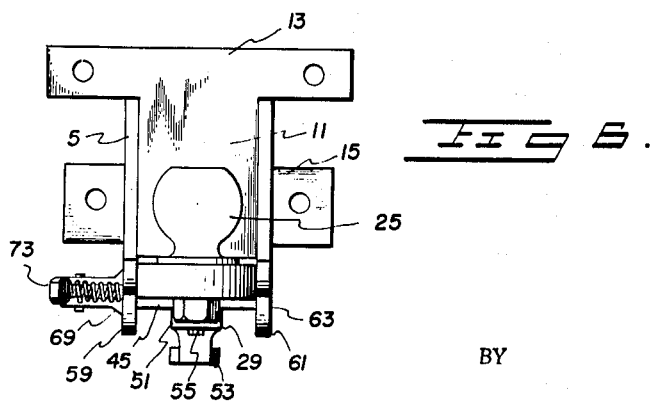
INVENTOR
JOHN R. TATE.
BY Peck & Peck
ATTORNEYS

United States Patent Office 2,733,936
Patented Feb. 7, 1956

2,733,936

RETRACTIBLE TRAILER HITCH

John R. Tate, Whittier, Calif.

Application April 12, 1954, Serial No. 422,351

9 Claims. (Cl. 280—491)

This invention relates broadly to the art of trailer hitches and in its more specific aspects it relates to a trailer hitch or coupling means whereby a trailer may be quickly and easily coupled and uncoupled to and from a towing vehicle which carries the hitch apparatus and in which the coupling mechanism of the hitch when not in use may be disposed in inoperative position which is substantially hidden from view beneath the towing vehicle; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

The use of trailers which may be uncoupled when desired from the towing vehicle has become widespread and the use of trailers with passenger cars is also common practice. In such uses the passenger vehicles or other towing car is often used without the trailer and for many reasons it is desirable that the hitch to which the tow bar of the trailer is coupled be disposed in a position which is out of the way and out of sight when it is not in use. This is particularly true with respect to passenger cars wherein the trailer hitch which is carried thereby tends to detract from the overall styling and appearance of the vehicle and also if left in operative towing position when a trailer is not attached thereto is apt to be struck and damaged. It is conventional practice to provide a towing vehicle with a trailer hitch apparatus, parts of which extend rearwardly beyond the rear bumper of the vehicle so that in parking the vehicle and in other traffic situations the extending portions of the hitch are often damaged if the trailer is not attached thereto.

It is, therefore, one of my prime objects to provide a trailer hitch for permanent attachment to a towing vehicle which is arranged to be positioned out of sight from the exterior of the vehicle when it is not in use and no trailer is attached thereto. In devising a trailer hitch with this purpose in view I have provided an organization whereby the actuation of the coupling portions of the trailer hitch to and from operative exposed position and inoperative hidden position is greatly simplified so that the user of the vehicle may by certain easy manipulations actuate the coupling portions of the hitch to operative and inoperative positions. The coupling portions of the trailer hitch which I have devised may be actuated by the user of the vehicle without requiring the user to crawl under the vehicle or to reach into difficult and inaccessible areas. Thus, the apparatus may be actuated with considerable ease.

It is evident that a trailer hitch which consists of more than a mere stationary coupling means must be so designed that when it is in operative position coupled to a trailer it is locked against inadvertent movement to inoperative position whereby the trailer would become uncoupled. The trailer hitch of this invention involves foolproof means for securely locking the coupling portions thereof in operative extended position and this locking means is of simple design and construction to facilitate the operation thereof by the user of the car.

In trailer hitches which provide for the disposition of the coupling elements in two positions, that is operative exposed and in operative hidden positions, it is not only essential to securely lock and maintain the coupling portions of the hitch in operative position but it is likewise essential for the proper operation of the apparatus that the coupling portions of the hitch be locked when the hitch is disposed in inoperative hidden position. One of the highly advantageous features and characteristics of my invention resides in an arrangement whereby the means which I have provided for locking the coupling portions of the hitch in operative exposed position also functions and serves as the means for locking and securing the coupling portions of the hitch in inoperative position. Thus, the number of parts of the entire apparatus have been substantially reduced to thereby provide for economy of production and the actuation of the apparatus is substantially expedited by this novel and unique arrangement.

This invention is characterized by a construction whereby the apparatus is adapted for easy installation on practically any conventional type passenger vehicle, truck or the like. It provides a strong and serviceable hitch apparatus with relatively few operating parts so that after it is once installed on a vehicle it may be used without requiring repairs or replacement of parts.

The trailer hitch of this invention has been designed to provide a compact easily installed apparatus which is of strong construction and may be economically produced.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in side elevation of a towing vehicle with parts thereof broken away to illustrate the trailer hitch attached thereto and in operative position coupled to a trailer.

Fig. 2 is a view in side elevation of the trailer hitch assembly attached to a towing vehicle and with the coupling portions of the hitch in operative position.

Fig. 3 is a top plan view of the trailer hitch assembly with the coupling portions thereof in operative position.

Fig. 4 is a view in section of the trailer hitch assembly with the coupling portions thereof in inoperative hidden position.

Fig. 5 is a bottom plan view of the trailer hitch assembly with the coupling portions thereof in operative position.

Fig. 6 is a view in front elevation of the trailer hitch assembly with the coupling portions thereof in operative position.

In the accompanying drawings I have illustrated my trailer hitch as consisting of a carriage which is formed of a pair of longitudinally extending transversely spaced carriage plates 1 and 3. Each of these plates are dimensionally similar and of the same configuration and are formed of greater length than width and include a rearward section 5 of greater width or depth than a forward body section 7, and these carriage plates are each provided with a supporting arm 9 extending forwardly from the body section. The plates are preferably constructed of ¼″ plate steel and are maintained in transversely spaced relationship by means of a generally T-shaped metallic plate consisting of a vertical body portion 11 and a transverse upper portion 13. The body portion 11 of the T-shaped plate is positioned between the carriage plates 1 and 3 adjacent the rearward edges thereof and may be welded or otherwise fixed thereto with the top transverse portion 13 of the plate preferably resting on the upper edges of the carriage plates and extending therebeyond. The carriage plates 1 and 3 are also fastened together by a vertically positioned transversely extending metallic plate 15 which is welded or otherwise fixed to the forward vertical edges of the body portions 7 of the carriage plates 1 and 3 and rests upon the upper edges of the forwardly extending arms 9. The vertical transverse plate 15 is of greater length than the space between the carriage plates 1 and 3 so that it extends on each side laterally beyond these plates. I weld or otherwise fix the horizontally disposed metallic base supporting plate 17 to the forward surface of the vertical transverse plate 15 and to the upper edges of the forwardly extending arms 9 of the carriage plates, the base supporting plate 17 being of substantially the same length as the vertically positioned transverse plate 15. It will be recognized that I have provided a rigid metallic carriage assembly which, as will be explained hereinafter, is adapted to operatively mount the various elements comprising the hitch organization which I have devised and it will be further apparent that the rigid boxlike carriage assembly which has been described above is adapted to be mounted on the frame of the towing vehicle and I will describe this mounting arrangement hereinafter.

I have designated the coupling assembly of my trailer hitch in its entirety by the numeral 19 and this assembly includes a generally L-shaped tow bar having an apron or the like supporting member 21 from one end of which extends a tow bar 23. The apron 21 and tow bar 23 may be integrally formed or may consist of separate parts fastened together. On the outer end of the tow bar I mount a coupling ball 25, the coupling ball being illustrated in the drawings as fixed to the tow bar 23 by means of a stem 27 which extends through the tow bar and is fixed to the ball and is secured to the tow bar by means of a nut 29. It will be obvious that this coupling ball may be fixed to the tow bar in any other suitable manner. I also provide a rubber seat 31 which is fixed by adhesive cement or any other suitable means to and covering a portion of the tow bar and a portion of the supporting member 21. This rubber which is preferably a sponge rubber acts as a cushion to prevent rattles as will become apparent hereinafter. The coupling assembly 19 is pivotally mounted for operation to and from inoperative position within the carriage and between the carriage plates 1 and 3. The outer or free end of the supporting member 21 of the L-shaped tow bar is formed to receive therethrough a spindle 33 which extends between and is journaled in oppositely disposed holes or apertures as at 35 which are provided in the carriage plates 1 and 3, cotter pins 37 being used to maintain the spindle in operative journaled position.

As I have stated the coupling assembly 19 is operatively mounted on the spindle 33 so that it may be pivoted or swung thereon to inoperative hidden position within the carriage and between the carriage plates 1 and 3 as particularly illustrated in Fig. 4 of the drawings and so that it may be moved from this inoperative hidden position by pivoting on the spindle 33 to operative rearwardly extended position with the coupling ball 25 in upright position as illustrated in dotted lines in Fig. 4 of the drawings. The position which is illustrated in full lines in Fig. 4 of the drawings is the inoperative hidden position of the coupling assembly and when a trailer is not being towed the coupling assembly 19 is positioned between the plates so that none of the trailer hitch is visible from the exterior of the towing vehicle.

It is necessary, of course, to provide means for maintaining this coupling assembly, which is mounted for free pivoting movement, in either inoperative hidden position or in operative towing position and I have provided a coupling assembly positioning plate 39 which at its forward end receives a spindle 41 therethrough, the spindle 41 being journaled in oppositely disposed apertures in the carriage plates 1 and 3 and being maintained in journaled position by means of cotter pins or the like 43. The positioning plate 39 is of slightly less width than the distance between the carriage plates 1 and 3 so that the positioning plate when in operative horizontal rearwardly extended position will fit between the two carriage plates. The rear end of the positioning plate is of somewhat greater thickness as at 40 than is the thickness of the remaining portion of the positioning plate. The reason for this thickening structure at the rear end of the positioning plate will be explained hereinafter. Consideration of the drawings discloses that the positioning member 39 is journaled in the carriage plates 1 and 3 at a position adjacent the lower edge of the body portions 7 of the carriage plates and that the coupling assembly 19 is journaled in the rear widened sections 5 of the carriage plates at a point substantially upwardly removed from the bottom edges of said plates. Thus, when the positioning member 39 is in rearwardly directed substantially horizontal operative position as illustrated in Fig. 4 of the drawings and the coupling assembly is in inoperative hidden position the positioning member 39 will extend under and for the full length of the tow bar portion 23 of the coupling assembly.

In order to releasably maintain the positioning member in operative rearwardly extending substantially horizontal position forming in effect a bottom for the carriage assembly I provide a latch organization including a bolt member 45 which is pivotally fixed to the bottom surface of the positioning member 39 by means of a pin 47 which extends through the positioning member 39 and is maintained therein by a nut 49 and is of a length sufficient to extend through the positioning member 39, the bolt 45 and a distance beyond the exposed surface of the bolt and through the end 51 of an operating lever having a handle 53 which extends from the end 51. The latch organization is maintained in pivotal association with the positioning member 39 by means of the nut 49 and a further nut 55. Since the operating lever 53 is adapted to rotate or pivot the bolt 45 relative to the positioning member 39, the end 51 of the operating lever which extends over and in contact with the bolt 45 may be welded or otherwise fixed to the bolt so that the operating lever and the bolt will rotate as a unit. The bolt 45 is of greater length than the width of the positioning member 39 so that when the bolt is in operative position extending transversely of member 39 as will be explained, locking the positioning member in operative position it will extend beyond the longitudinal edges of the positioning member as at 57.

The carriage plate 1 is provided with a forwardly directed finger or keeper 59 which depends from the lower edge of the carriage plate in spaced relation thereto to provide a slot or recess between the upper edge of the finger 59 and the lower edge of the carriage plate 1, while the carriage plate 3 is provided with a similar finger or keeper 61 which extends rearwardly and in the opposite direction from the finger 59 and is spaced from the lower edge of the carriage plate 3 to provide a slot or recess 63 between the upper edge of the finger and the lower edge of the carriage plate. Consideration of the drawings will indicate that the fingers or keepers 59 and 61 are fixed to and positioned on the carriage plates in substantially transverse alignment with the bolt 45 when the positioning member 39 is in operative position.

When a trailer is not being used and the coupling assembly 19 is pivoted or swung on the spindle 33 to inoperative hidden position so that it extends in inverted position between the two carriage plates as illustrated particularly in Fig. 4 of the drawings it is maintained in this inoperative position by the positioning member 39 which is pivoted on the spindle 41 to rearwardly extending horizontal position in which position the coupling ball 25 will rest upon an antirattle cushion 65 which is caused to adhere to the positioning member 39. With these various parts so disposed the positioning member 39 is maintained in operative position supporting the coupling assembly 19 in inoperative position by means of the latch organization, the bolt when the positioning member is swung into operative position being pivoted thereon so that the bolt is longitudinally disposed relative to the positioning member and the extending ends 57 thereof are positioned along the positioning member and not in extended position over the longitudinal edges thereof. Thus, when the positioning member is swung into forwardly extending substantially horizontal operative position the handle 53 of the operating lever is grasped and the bolt 45 is rotated or pivoted so that one extended edge 57 is positioned within the slot provided by one finger and the other extended edge is positioned within the slot provided by the other finger so that these extended ends of the bolt rest in the slots on the fingers to thereby maintain the positioning member in operative position.

In order to insure against accidental or inadvertent pivotal movement of the latch organization to thereby release the positioning member I provide a dog designated generally by the numeral 67 which is pivotally mounted on a bracket 69 which extends outwardly from the carriage plate 3 and the finger 61, the dog 67 being spring loaded by a coil spring or the like 71 which constantly urges it into dogging position to lock the bolt against pivotal movement. The dog 67 includes a thumb bearing point 73 at one end and at the opposite end a working nose 75 which is adapted to extend into a notch 77 which is provided in the edge of the bolt 45 which is adjacent the dog when the bolt is in position in the slots of the fingers to thereby prevent rotation of the bolt to release the positioning plate.

The trailer hitch is mounted on a towing vehicle in position forwardly of the bumper of the vehicle and under the rear body portion thereof so that it is hidden from view. One example from among many of the mounting arrangement which may be used with this trailer hitch is illustrated in the drawings wherein the numeral 79 indicates a conventional rear bumper on the towing vehicle and the upper transverse portion 13 of the T-shaped plate is securely supported from the bumper 79 by means of bolts or the like 81. At its forward end the carriage assembly of the trailer hitch may be fastened to the frame of the towing vehicle which is designated in its entirety by the numeral 83, by means of bolts 85 and 87 which are fastened to the plates 15 and 17 of the carriage assembly of the trailer hitch. It will be understood that various mounting arrangements may be used for this trailer hitch and that it is adaptable for mounting with various types of vehicles.

When the coupling assembly 19 is in inoperative position as illustrated in Fig. 4 of the drawings and it is desired to move it to operative position for the attachment of a trailer or other towed vehicle thereto the dog 67 is operated by exerting pressure on the thumb bearing point 73 to pivot the dog and release the working nose 75 from the notch 77 in the bolt 45. The bolt is then pivoted by means of the operating lever 53 to remove the extended ends 57 of the bolt from position within the slots provided by the fingers 59 and 61 whereupon the positioning member 39 will be swung downwardly and the coupling assembly may then be swung downwardly from its inoperative position between the carriage plates 1 and 3 and then up into rearwardly extending substantially horizontal operative position as particularly disclosed in Fig. 2 of the drawings. When the coupling assembly is operatively positioned as described it is locked in this position by returning the positioning plate 39 to operative horizontal position and rotating the bolt so that the extended ends are again received within the slots provided by the fingers to thereby maintain the positioning plate in operative horizontal position. With the elements operatively positioned as described the antirattle cushioning pad 31 will abut against the lower edge of the T-shaped plate 11 and the apron or supporting member 21 will through the antirattle cushioning pad be in abutment with the forward lower surface of the plate 11. The coupling assembly will be maintained in this position since the rearward thickened edge 40 of the positioning member 39 will be in abutting position with respect to the forward end of the tow bar 23.

When the coupling assembly is operatively positioned as described and locked and maintained in this position by means of the positioning member the coupling assembly projects rearwardly from the towing vehicle which I have designated generally by the numeral 89 and beyond the rear bumper 79 thereof so that the coupling ball 25 is in accessible position for attachment of a coupling element 91 of a tow bar 93 which extends from a trailer which is designated in its entirety by the numeral 95. It will be understood, of course, that small and large trailers may be coupled to a towing vehicle by this trailer hitch and it is evident that this invention is not limited to use with trailers or towing vehicles of the type illustrated in Fig. 1 of the drawings.

If desirable I may provide an additional locking means for maintaining the positioning member against inadvertent or accidental movement from its operative position maintaining the coupling assembly either in inoperative or operative position. This extra safety lock may take the form of a spring loaded plug mounted to operatively extend through one of the carriage plates for projection under the action of the spring into a socket which may be provided in a longitudinal edge of the positioning member.

I claim:

1. A trailer hitch including a carriage assembly adapted to be mounted on and beneath a towing vehicle, a coupling assembly pivotally mounted on said carriage assembly and swingable to inoperative position disposed within the carriage assembly and to operative position with a part thereof outside the carriage assembly and extended rearwardly beyond the towing vehicle in accessible position for coupling of the tow bar of a trailer thereto, and means for releasably maintaining said coupling assembly in either operative or inoperative position, said means including an elongated member operatively connected to said carriage assembly for movement to and from operative position and said elongated member when in operative position being in supporting engagement with said coupling assembly when it is in either operative or inoperative position to maintain it in either of said positions, and a bolt pivotally mounted on said member of greater length than the width of the member to provide a portion extending beyond each longitudinal edge of the member when the bolt is pivoted to extend transversely of the member, keepers on said carriage assembly adapted to receive the extending portions of the bolt to thereby lock said member in operative position.

2. A trailer hitch in accordance with claim 1 wherein manually operable means is mounted on said carriage assembly which is coactive with means on said bolt when the bolt is transversely positioned relative to the member to releasably lock said bolt in such transverse position.

3. A trailer hitch including a carriage assembly adapted to be mounted on and beneath a towing vehicle, said carriage assembly including a pair of plates longitudinally mounted with respect to the towing vehicle and transversely spaced, a coupling assembly pivotally supported from said plates and swingable to inoperative position between said plates and to operative position with a portion thereof extended rearwardly beyond the towing vehicle, and a coupling assembly positioning member pivotally mounted on said plates and swingable to and from operative position between the plates and forming in operative position a bottom for a part of the area between the plates, said positioning member when in operative position being in supporting engagement with said coupling assembly when it is in either operative or inoperative position, and means for releasably locking said positioning member in operative position.

4. A trailer hitch including a carriage assembly adapted to be mounted on and beneath a towing vehicle, said carriage assembly including a pair of elongated plates longitudinally mounted with respect to the towing vehicle and transversely spaced, a coupling assembly including a tow bar pivotally supported from said plates adjacent to the rearward ends thereof and swingable to inoperative position between said plates and to operative position with a portion thereof extended rearwardly beyond the towing vehicle, and a coupling assembly positioning member pivotally mounted on said plates at points forwardly thereof relative to the points of support of said coupling assembly and said positioning member when in operative position extending rearwardly from its points of support and between said plates and in supporting engagement with said coupling assembly when in inoperative position, said positioning member being swingable to inoperative position to release said coupling assembly for movement to operative position, and the rearward end of said positioning member when in operative position being in supporting engagement with said coupling assembly when in operative position, and means for releasably locking said positioning member in operative position.

5. A trailer hitch including a carriage assembly adapted to be mounted on and beneath a towing vehicle, said carriage assembly including a pair of elongated plates longitudinally mounted with respect to the towing vehicle and transversely spaced, a forward transverse plate and a rearward transverse plate extending between and fixed to said elongated plates, a coupling assembly pivotally supported from said elongated plates and swingable to inoperative position between said elongated plates and said transverse plates and to operative position in engagement with said rearward transverse plate and with a portion thereof extended rearwardly beyond the towing vehicle in accessible position for coupling the tow bar of a trailer thereto, and a coupling assembly positioning member pivotally mounted on said plates at points forwardly thereof relative to the points of support of said coupling assembly and said positioning member when in operative position extending rearwardly from its points of support and between said elongated plates and in supporting engagement with said coupling assembly when it is in inoperative position, said positioning member being swingable to inoperative position to release said coupling assembly for movement to operative position in engagement with said rearward transverse plate, and the rearward end of said positioning member when in operative position being in supporting engagement with said coupling assembly when in operative position, and means for releasably locking said positioning member in operative position.

6. A trailer hitch including a carriage assembly adapted to be mounted on and beneath a towing vehicle, a coupling assembly pivotally mounted on said carriage assembly and swingable to inoperative position disposed within the carriage assembly and to operative position with a part thereof outside the carriage assembly and extended rearwardly beyond the towing vehicle in accessible position for coupling of the tow bar of a trailer thereto, and a coupling assembly positioning member pivotally mounted on said carriage assembly at points forwardly thereof relative to the points of pivotal support of said coupling assembly, and said positioning member when in operative position extending rearwardly from its points of pivotal support and in supporting engagement with said coupling assembly when in inoperative position, said positioning member being swingable to inoperative position to release said coupling assembly for movement to operative position, and the rearward end of said positioning member when in operative position being in supporting engagement with said coupling assembly when in operative position, and means for releasably locking said positioning member in operative position.

7. A trailer hitch including a carriage assembly adapted to be mounted on and beneath a towing vehicle, a coupling assembly pivotally mounted on said carriage assembly and swingable to inoperative position disposed within the carriage assembly and to operative position with a part thereof outside the carriage assembly and extended rearwardly beyond the towing vehicle in accessible position for coupling of the tow bar of a trailer thereto, and means for releasably maintaining said coupling assembly in either operative or inoperative position, said means including a plate member pivotally mounted on said carriage assembly at points thereon forwardly spaced relative to the points of pivotal mounting of said coupling assembly, said plate member being swingable to and from operative position and said plate member when in operative position being in alignment with the part of the coupling assembly which is outside the carriage assembly and extends rearwardly beyond the towing vehicle and in supporting engagement with a forward surface thereof when said coupling assembly is in operative position, and said plate member when in operative position being in supporting engagement with said coupling assembly when it is in inoperative position, and means for releasably locking said plate member in operative position.

8. A trailer hitch including a carriage assembly adapted to be mounted on and beneath a towing vehicle, a coupling assembly pivotally mounted on said carriage assembly and swingable to inoperative position disposed within the carriage assembly and to operative position with a part thereof outside the carriage assembly and extended rearwardly beyond the towing vehicle in accessible position for coupling of the tow bar of a trailer thereto, and means for releasably maintaining said coupling assembly in either operative or inoperative position, said means including a member operatively connected to said carriage assembly for movement to and from operative position and said member when in operative position being in supporting engagement with said coupling assembly when it is in either operative or inoperative position to maintain it in either of said positions, and a bolt pivotally mounted on said member and keepers fixed on said carriage assembly in position thereon for receiving said bolt when it is pivoted into position locking said member in operative position.

9. A trailer hitch including a carriage assembly adapted to be supported on and beneath a towing vehicle, said carriage assembly including a pair of transversely spaced longitudinally extending elongated plates and a transverse plate extending between and fixed to said elongated plates, a coupling assembly including a tow bar and a supporting element therefor, said supporting element being pivotally mounted on said elongated plates forwardly of the transverse plate and above the lower edge thereof, said coupling assembly being swingable to inoperative position disposed between said elongated plates and to operative position with said tow bar outside the carriage assembly and extended rearwardly beneath the lower edge of said transverse plate and beyond the towing vehicle in accessible position for coupling the tow bar of a trailer thereto, said supporting element being in engagement with said transverse plate when in operative position to prevent further swinging movement of the coupling assembly in one direction and means operatively mounted on said carriage assembly for preventing swinging movement of said coupling assembly in the opposite direction when it is in operative position, and said means operative to releasably maintain said coupling assembly in inoperative position.

References Cited in the file of this patent

UNITED STATES PATENTS

| | | |
|---|---|---|
| 2,478,709 | Riemann et al. | Aug. 9, 1949 |
| 2,527,155 | Schlenz | Oct. 24, 1950 |
| 2,531,859 | Mock | Nov. 28, 1950 |
| 2,547,299 | Williams | Apr. 3, 1951 |
| 2,576,383 | Avery | Nov. 27, 1951 |